(12) United States Patent
Yamashita et al.

(10) Patent No.: US 12,257,565 B2
(45) Date of Patent: Mar. 25, 2025

(54) ACTIVATED CARBON FOR ADSORBING PER- AND POLYFLUOROALKYL COMPOUNDS IN WATER SAMPLE

(71) Applicants: FUTAMURA KAGAKU KABUSHIKI KAISHA, Nagoya (JP); NATIONAL INSTITUTE OF ADVANCED INDUSTRIAL SCIENCE AND TECHNOLOGY, Tokyo (JP)

(72) Inventors: Nobuyoshi Yamashita, Tsukuba (JP); Sachi Taniyasu, Tsukuba (JP); Tsutomu Kousaka, Aichi (JP); Makoto Yokoi, Minokamo (JP); Chiharu Hori, Minokamo (JP); Kodai Shimamura, Minokamo (JP); Takuya Asano, Minokamo (JP)

(73) Assignees: FUTAMURA KAGAKU KABUSHIKI KAISHA, Nagoya (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 545 days.

(21) Appl. No.: 17/753,081

(22) PCT Filed: Aug. 11, 2020

(86) PCT No.: PCT/JP2020/030576
§ 371 (c)(1),
(2) Date: Feb. 17, 2022

(87) PCT Pub. No.: WO2021/033596
PCT Pub. Date: Feb. 25, 2021

(65) Prior Publication Data
US 2022/0266217 A1 Aug. 25, 2022

(30) Foreign Application Priority Data

Aug. 20, 2019 (JP) ................. 2019-150393
Aug. 7, 2020 (JP) ................. 2020-135049

(51) Int. Cl.
*B01J 20/20* (2006.01)
*B01J 20/28* (2006.01)
*C02F 1/28* (2023.01)
*C02F 101/36* (2006.01)

(52) U.S. Cl.
CPC ......... *B01J 20/20* (2013.01); *B01J 20/28023* (2013.01); *B01J 20/28064* (2013.01); *B01J 20/28066* (2013.01); *C02F 1/281* (2013.01); *C02F 2101/36* (2013.01)

(58) Field of Classification Search
CPC ...... B01J 20/20; B01J 20/28; B01J 20/28023; B01J 20/28064; B01J 20/28066; C01B 32/30; C02F 1/281; C02F 1/283; C02F 2101/36
See application file for complete search history.

(56) References Cited

U.S. PATENT DOCUMENTS

2019/0291073 A1* 9/2019 Hanamoto ........... B01J 20/2803

FOREIGN PATENT DOCUMENTS

| JP | 2012-101159 A | 5/2012 | |
| JP | 2013220413 A * | 10/2013 | ............... B01J 20/20 |
| WO | WO-2017199717 A1 * | 11/2017 | ......... B01D 39/2062 |
| WO | WO-2019/063150 A1 | 4/2019 | |

OTHER PUBLICATIONS

Machine translation of JP2013220413. (Year: 2013).*
International Search Report for the Application No. PCT/JP2020/030576 mailed Oct. 13, 2020.

* cited by examiner

*Primary Examiner* — Brian A McCaig
(74) *Attorney, Agent, or Firm* — Muncy, Geissler, Olds & Lowe, P.C.

(57) ABSTRACT

[OBJECT] To provide an activated carbon for adsorbing per- and polyfluoroalkyl compounds in a water sample, the activated carbon having a high collection rate of per- and polyfluoroalkyl compounds in a water sample, and a filter body using the same.
[ACHIEVING MEANS] An activated carbon for adsorbing per- and polyfluoroalkyl compounds in a water sample to desorbably adsorb per- and polyfluoroalkyl compounds in a water sample, wherein the activated carbon is composed of an activated carbon adsorbent having a BET specific surface area of 800 m²/g or more or a surface oxide amount of 0.20 meq/g or less, or alternatively, a BET specific surface area of 800 m²/g or more and a surface oxide amount of 0.50 meq/g or less, and wherein a sum ($V_{mic}$) of a volume of micropores of 1 nm or less of the activated carbon adsorbent is 0.30 cm³/g or more.

3 Claims, No Drawings

ACTIVATED CARBON FOR ADSORBING PER- AND POLYFLUOROALKYL COMPOUNDS IN WATER SAMPLE

FIELD

The present invention relates to a per- and polyfluoroalkyl compound-adsorbing activated carbon for collecting per- and polyfluoroalkyl compounds contained in a water sample.

BACKGROUND

Per- and polyfluoroalkyl compounds are fluorine-substituted aliphatic compounds having high thermal stability, high chemical stability, and high surface modification activity. Per- and polyfluoroalkyl compounds are widely used in industrial applications such as surface treatment agents, packaging materials, liquid fire-extinguishing agents, and chemical applications which take advantage of the characteristics described above.

Since some per- and polyfluoroalkyl compounds are highly stable chemical substances, they are not easily decomposed under natural conditions after being released into the environment. For this reason, in recent years, per- and polyfluoroalkyl compounds have been recognized as Persistent Organic Pollutants (POPs), and from 2010, the production and use of perfluorooctane sulfonic acid (PFOS) (IUPAC name: 1,1,2,2,3,3,4,4,5,5,6,6,7,7,8,8-heptadecafluorooctane-1-sulfonic acid) are regulated under the Stockholm Convention on Persistent Organic Pollutants (POPs Convention).

Note that perfluoroalkyl compounds have a completely fluorinated linear alkyl group and are substances represented by the chemical formula (i). Examples thereof include perfluorooctane sulfonic acid (PFOS) and perfluorooctanoic acid (PFOA) (IUPAC name: 2,2,3,3,4,4,5,5,6,6,7,7,8,8,8-pentadecafluoroocanoic acid).

[Formula 1]

$$C_nF_{2n+1}R \qquad (i)$$

Polyfluoroalkyl compounds refer to compounds having an alkyl group in which some of the hydrogen atoms thereof have been replaced with fluorine atoms, and are substances represented by the chemical formula (ii). Examples thereof include fluorotelomer alcohols.

[Formula 2]

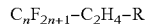

$$C_nF_{2n+1}\text{-}C_2H_4\text{-}R \qquad (ii)$$

In this manner, per- and polyfluoroalkyl compounds remain in the natural world (in water, soil, and the atmosphere), and thus, establishment of quantitative test methods for per- and polyfluoroalkyl compounds are being investigated. The challenge for studying quantitative test methods is the development of collection materials having high adsorption and desorption performance of per- and polyfluoroalkyl compounds. Water or air, as a sample containing a trace amount of per- and polyfluoroalkyl compounds, is brought into contact with a collection material to collect the per- and polyfluoroalkyl compounds, and the compounds adsorbed on the collection material are desorbed into an extraction liquid by an extraction step and concentrated. After concentration, quantitative measurement can be performed with a device such as an LC-MS/MS or GC-MS/MS to measure the concentration of per- and polyfluoroalkyl compounds contained in the sample.

As an existing collection material, for example, an organic fluorine-based compound-adsorbing material composed of a cyclodextrin polymer has been proposed (Patent Literature 1). This adsorbing material is not suitable for use as a collection material used for quantitative measurement because it is specialized only for adsorption and compounds cannot be desorbed therefrom. Furthermore, the cyclodextrin polymer is in the form of a powder or fine particles, and has problems such as poor handling, high resistance during liquid passage or aeration, and a risk of outflow of the fine powder to the secondary side.

Furthermore, per- and polyfluoroalkyl compounds remain in the environment in various forms having a wide range of physicochemical properties, and existing adsorption materials do not have sufficient collection performance, whereby there is a problem in that accurate quantitative measurement cannot be performed.

The applicant has investigated activated carbon as a collection material for per- and polyfluoroalkyl compounds, and discovered that it enables the collection of per- and polyfluoroalkyl compounds and greatly contributes to accurate quantitative measurement.

CITATION LIST

Patent Literature

[PTL 1] Japanese Unexamined Patent Publication (Kokai No. 2012-101159

SUMMARY

Technical Problem

The present invention has been conceived of in light of the points above, and in particular, provides an activated carbon for adsorbing per- and polyfluoroalkyl compounds in a water sample, the activated carbon being capable of desorbably collecting per- and polyfluoroalkyl compounds in a water sample, and a filter body using the same.

Solution to Problem

Specifically, a first invention relates to an activated carbon for adsorbing per- and polyfluoroalkyl compounds in a water sample to desorbably adsorb per- and polyfluoroalkyl compounds in a water sample, wherein the BET specific surface area of an activated carbon adsorbent is 800 m$^2$/g or more or a surface oxide amount thereof is 0.20 meq/g or less.

A second invention relates to an activated carbon for adsorbing per- and polyfluoroalkyl compounds in a water sample to desorbably adsorb per- and polyfluoroalkyl compounds in a water sample, wherein the BET specific surface area of an activated carbon adsorbent is 800 m$^2$/g or more, and a surface oxide amount is 0.50 meq/g or less.

A third invention relates to the activated carbon for adsorbing per- and polyfluoroalkyl compounds in a water sample according to the first or second invention, wherein a sum ($V_{mic}$) of a volume of micropores of 1 nm or less of the activated carbon adsorbent is 0.30 cm$^3$/g or more.

A fourth invention relates to the activated carbon for adsorbing per- and polyfluoroalkyl compounds in a water sample according to any one of the first through third inventions, wherein the activated carbon adsorbent is a fiber-like activated carbon.

A fifth invention relates to a filter body for adsorbing per- and polyfluoroalkyl compounds in a water sample, wherein the adsorbing activated carbon according to any one of the first through fourth inventions is retained therein.

Advantageous Effects of Invention

According to the activated carbon for adsorbing per- and polyfluoroalkyl compounds in a water sample according to the first invention, since there is provided a per- and polyfluoroalkyl compound-adsorbing activated carbon for desorbably adsorbing per- and polyfluoroalkyl compounds in a water sample, wherein the BET specific surface area of an activated carbon adsorbent is 800 m²/g or more or a surface oxide amount thereof is 0.20 meq/g or less, the compounds, Which have been considered difficult to quantitatively measure, can be desorbably collected.

According to the activated carbon for adsorbing per- and polyfluoroalkyl compounds in a water sample according to the second invention, since there is provided a per- and polyfluoroalkyl compound-adsorbing activated carbon for desorbably adsorbing per- and polyfluoroalkyl compounds in a water sample, wherein the BET specific surface area of an activated carbon adsorbent is 800 m²/g or more and a surface oxide amount is 0.50 meq/g or less, the compounds, which have been considered difficult to quantitatively measure, can be desorbably collected.

According to the activated carbon for adsorbing per- and polyfluoroalkyl compounds in a water sample according to the third invention, since in the first or second invention, a sum ($V_{mic}$) of a volume of micropores of 1 nm or less of the activated carbon adsorbent is 0.30 cm³/g or more, per- and polyfluoroalkyl compounds can be efficiently desorbably collected.

According to the activated carbon for adsorbing per- and polyfluoroalkyl compounds in a water sample according to the fourth invention, since in any one of the first through third inventions, the activated carbon adsorbent is a fiber-like activated carbon, the contact efficiency with the per- and polyfluoroalkyl compounds is increased, whereby adsorption performance can be improved.

According to the filter body for adsorbing per- and polyfluoroalkyl compounds in a water sample according to the fifth invention, since the adsorbing activated carbon according to any one of the first through fourth inventions is retained therein, it is possible to provide good handleability while increasing the collect efficiency of per- and polyfluoroalkyl compounds.

DESCRIPTION OF EMBODIMENTS

The activated carbon for adsorbing per- and polyfluoroalkyl compounds in a water sample of the present invention is composed of a fiber-like activated carbon or a granular activated carbon. The fiber-like activated carbon is an activated carbon obtained by carbonizing and activating appropriate fibers, and examples thereof include phenol resin type, acrylic resin type, cellulose type, and coal pitch type activated carbons. The fiber length, cross-sectional diameter, etc., are appropriate.

Examples of the raw material of granular activated carbons include raw materials such as wood (waste wood, wood from thinning, and sawdust), coffee bean pomace, rice husks, coconut husks, bark, and fruit nuts. These naturally derived raw materials tend to develop pores by carbonization and activation. Furthermore, since the use thereof is a secondary use of waste, they can be procured at low cost. Baked products derived from synthetic resins such as tires, petroleum pitch, urethane resins, phenol resins, and coal can also be used as raw materials.

The activated carbon raw material is carbonized by heating in a temperature range of 200° C. to 600° C., if necessary, to form fine pores. Next, the activated carbon raw material is exposed to steam and carbon dioxide gas in a temperature range of 600° C. to 1200° C. and activated. As a result, activated carbon having various developed pores is completed. Alternatively, for example, zinc chloride activation can be used as the activation. Furthermore, sequential cleaning is also performed.

The physical properties of the activated carbon produced in this manner define the adsorption performance of the substance to be adsorbed. The adsorption performance of the activated carbon for adsorbing per- and polyfluoroalkyl compounds, which are the target substances to be adsorbed of the present invention, is defined by the specific surface area, which is an index representing the amount of pores formed in the activated carbon. Note that as used herein, the specific surface area of each preparation example is measured by the BET method (Brunauer, Emmett and Teller method).

The adsorption performance of activated carbon is also defined by the acidic functional groups present on the surface of the activated carbon. The acidic functional groups, which increase due to surface oxidation of the activated carbon, are primarily hydrophilic groups such as carboxyl groups and phenolic hydroxyl groups. Acidic functional groups on the surface of the activated carbon affect the collection capability. The amount of these acidic functional groups can be understood as the surface oxide amount.

In water, when the surface oxide amount of the activated carbon is increased, it is presumed that water molecules strongly adsorbed to the surface functional groups by hydrogen bonds and clusters of water molecules generated thereby block the pores and prevent the target adsorption substance from physically accessing the adsorption points (micropores). Thus, it is considered that the smaller the surface oxide amount of the activated carbon, the better the adsorption performance for the target adsorption substance.

As a method for decreasing the surface oxides of the activated carbon, a known method such as heat treatment in an inert gas atmosphere can be used, whereby the acidic functional groups such as phenolic hydroxyl groups and carboxyl groups on the surface of activated carbon can be decreased.

Furthermore, activated carbon is also defined by the pore size of the pores. In the case of an adsorbent material such as activated carbon, all of micropores, mesopores, and macropores are present. Depending on which range of pores among these are better developed, the target and performance of activated carbon adsorb will change. The activated carbon of the present invention is desired to effectively and desorbably adsorb molecules of per- and polyfluoroalkyl compounds.

The adsorption performance of the activated carbon for desorbably adsorbing per- and polyfluoroalkyl compounds in a water sample, as derived from the Examples, which are described later, is exhibited by setting the specific surface area to 800 m²/g or more or the surface oxide amount to 0.20 meq/g or less. Since it is considered that the acidic functional groups present on the surface of the activated carbon block the pores due to the water molecules adsorbed by hydrogen bonds and the clusters of water molecules produced thereby, when the surface oxide amount is small, even if the specific surface area is small and the amount of pores is small, the activated carbon can adsorb the compounds to a certain level or more. Conversely, even when the surface oxide amount is large and the adsorption of the compounds in the pores is inhibited, if the specific surface area is large and the amount of pores is large, the activated carbon can adsorb the compounds to a certain level or more.

Furthermore, if the specific surface area is equal to or greater than a certain level and the surface oxide amount is equal to or less than a certain level, the per- and polyfluoroalkyl compounds in the water sample can be desorbably adsorbed more efficiently. As shown in the Examples, which are described later, by setting the BET specific surface area of the activated carbon adsorbent to 800 m$^2$/g or more and the surface oxide amount to 0.50 meq/g or less, the adsorption performance for per- and polyfluoroalkyl compounds in a water sample can be further enhanced.

EXAMPLES

[Activated Carbon Adsorbents Used]

The inventors used the following raw materials to produce per- and polyfluoroalkyl compound-adsorbing activated carbons.

Fiber-Like Activated Carbon

Fiber-like activated carbon "CF" (average fiber diameter: 15 μm): produced by Futamura Chemical Co., Ltd. {hereinafter referred to as C1};

Fiber-like activated carbon "FE3010" (average fiber diameter: 15 μm): produced by Futamura Chemical Co., Ltd. {hereinafter referred to as C2};

Fiber-like activated carbon "FE3012" (average fiber diameter: 15 μm): produced by Futamura Chemical Co., Ltd. {hereinafter referred to as C3};

Fiber-like activated carbon "FE3013" (average fiber diameter: 15 μm): produced by Futamura Chemical Co., Ltd. {hereinafter referred to as C4};

Fiber-like activated carbon "FE3015" (average fiber diameter: 15 μm): produced by Futamura Chemical Co., Ltd. {hereinafter referred to as C5};

Fiber-like activated carbon "FE3018" (average fiber diameter: 15 μm): produced by Futamura Chemical Co., Ltd. {hereinafter referred to as C6};

Granular Activated Carbon

Coconut shell activated carbon "CW480SZ" (average particle size: 250 μm): produced by Futamura Chemical Co., Ltd. {hereinafter referred to as C7}; and

[Collection Performance of Per- and Polyfluoroalkyl Compounds in Water Sample—Experiment 1]

The inventors conducted Collection Experiment 1 of per- and polyfluoroalkyl compounds in a water sample using the following Preparation Example 1.

Production of Preparation Example

Preparation Example 1

10 g of the fiber-like activated carbon "FE3015" (C5) produced by Futamura Chemical was immersed in 500 ml of a 6% concentration hydrogen peroxide solution, allowed to stand for 70 hours, then removed and dried to obtain the activated carbon of Preparation Example 1.

[Activated Carbon—Measurement 1]
[Surface Oxide Amount]

For the surface oxide amount (meq/g), using the Boehm method, the adsorbing activated carbon of each Example was shaken in a 0.05 N sodium hydroxide aqueous solution, filtered, and the filtrate was neutralized with 0.05 N hydrochloric acid. The amount of sodium hydroxide at the time of titration was used as the surface oxide amount.

[BET Specific Surface Area]

The specific surface area (m$^2$/g) was determined by the BET method by measuring the nitrogen adsorb isotherm at 77 K using the automatic specific surface area/pore distribution measuring device "BELSORP-mini II" produced by MicrotracBEL Corporation.

[Average Pore Diameter]

The average pore diameter (nm) was calculated from formula (iii) using the values of the pore volume (cm$^3$/g) and the specific surface area (m$^2$/g), assuming that the shape of the pores is cylindrical.

[Formula 3]

$$\text{Average pore diameter (nm)} = \left( \frac{\text{Pore volume (cm}^3/\text{g})}{\text{Specific Surface Area (m}^2/\text{g})} \right) \times 4 \times 1000 \quad \text{(iii)}$$

Table 1 shows the physical characteristics of the activated carbon of Preparation Example 1. From the top of Table 1, the surface oxide amount (meq/g), BET specific surface area (m$^2$/g), average pore diameter (nm), and average fiber diameter (μm) are shown.

TABLE 1

|  | Prep Ex 1 |
| --- | --- |
| Surface oxide amount (meq/g) | 0.48 |
| BET specific surface area (m$^2$/g) | 1463 |
| Average pore diameter (nm) | 1.69 |
| Average fiber diameter (μm) | 15 |

[Collection Efficiency of Per- and Polyfluoroalkyl Compounds in Water Sample—Measurement 1]

Evaluation was performed using fluorotelomer alcohols (hereinafter referred to as "FTOHs") as the per- and polyfluoroalkyl compounds. FTOHs are substances represented by the above-mentioned chemical formula (ii), and the substance names differ depending on the number of carbon atoms. For example, in the case of C$_8$F$_{17}$CH$_2$CH$_2$OH, this FTOH is referred to as 8:2FTOH (IUPAC name: 3,3,4,4,5,5,6,6,7,7,8,8,9,9,10,10,10-heptadecafluoro-1-decamp).

A standard reagent for each FTOH of the target was added to ultrapure water to prepare a 0.5 ng/ml (0.5 ppb) test solution.

0.2 g of the fiber-like activated carbon of Preparation Example 1 was filled in a 20 ml syringe, and 20 ml of the test solution described above was passed therethrough at a rate of 1 drop/sec. After aeration and dehydration for 30 seconds, the adsorbing activated carbon in the syringe was sufficiently contact-stirred with 15 ml of a mixed solvent containing dichloromethane and ethyl acetate as primary components, and then solid-liquid separated by centrifugation to collect the extract.

The extract was quantitatively measured using a GC-MS/MS (Quatri micro GC manufactured by Waters Corporation) in MRM mode, and the collection performance was confirmed.

Table 2 shows the recovery rate (%) of the FTOHs for each target substance for the activated carbon of Preparation Example 1. The target substances are 4:2FTOH, 6:2FTOH, 8:2FTOH, and 10:2FTOH.

TABLE 2

|  |  | Prep Ex 1 |
|---|---|---|
| Target Substance | 4:2FTOH | 72% |
|  | 6:2FTOH | 78% |
|  | 8:2FTOH | 82% |
|  | 10:2FTOH | 130% |

[Collection Performance of Per- and Polyfluoroalkyl Compounds in Water Sample—Experiment 2]

Next, the inventors conducted and evaluated the following Preparation Examples 2 to 13 using PFOA ($C_8HF_{15}O_2$) and PFOS ($C_8HF_{17}O_3S$) as the per- and polyfluoroalkyl compounds.

Preparation Example Production

Preparation Example 2

10 g of the fiber-like activated carbon "CF" (C1) produced by Futamura Chemical was used as the activated carbon of Preparation Example 2.

Preparation Example 3

10 g of the fiber-like activated carbon "CF" (C1) produced by Futamura Chemical was immersed in 500 ml of a 4.2% concentration hydrogen peroxide solution, allowed to stand for 220 hours, then removed and dried to obtain the activated carbon of Preparation Example 3.

Preparation Example 4

10 g of the fiber-like activated carbon "FE3010" (C2) produced by Futamura Chemical was used as the activated carbon of Preparation Example 4.

Preparation Example 5

10 g of the fiber-like activated carbon "FE3010" (C2) produced by Futamura Chemical was immersed in 500 ml of a 4.2% concentration hydrogen peroxide solution, allowed to stand for 150 hours, then removed and dried to obtain the activated carbon of Preparation Example 5.

Preparation Example 6

10 g of the fiber-like activated carbon "FE3012" (C3) produced by Futamura Chemical was used as the activated carbon of Preparation Example 6.

Preparation Example 7

10 g of the fiber-like activated carbon "FE3012" (C3) produced by Futamura Chemical was immersed in 500 ml of a 4.2% concentration hydrogen peroxide solution, allowed to stand for 100 hours, then removed and dried to obtain the activated carbon of Preparation Example 7.

Preparation Example 8

10 g of the fiber-like activated carbon "FE3013" (C4) produced by Futamura Chemical was immersed in 500 ml of a 1.5% concentration hydrogen peroxide solution, allowed to stand for 70 hours, then removed and dried to obtain the activated carbon of Preparation Example 8.

Preparation Example 9

10 g of the fiber-like activated carbon "FE301.5" (C5) produced by Futamura Chemical was used as the activated carbon of Preparation Example 9.

Preparation Example 10

10 g of the fiber-like activated carbon "FE3015" (C5) produced by Futamura Chemical was immersed in 500 ml of a 1.5% concentration hydrogen peroxide solution, allowed to stand for 40 hours, then removed and dried to obtain the activated carbon of Preparation Example 10.

Preparation Example 11

10 g of the fiber-like activated carbon "FE3015" (C5) produced by Futamura Chemical was immersed in 500 ml of a 4.2% concentration hydrogen peroxide solution, allowed to stand for 70 hours, then removed and dried to obtain the activated carbon of Preparation Example 11.

Preparation Example 12

10 g of the fiber-like activated carbon "FE3015" (C5) produced by Futamura Chemical was immersed in 500 ml of a 14.0% concentration hydrogen peroxide solution, allowed to stand for 350 hours, then removed and dried to obtain the activated carbon of Preparation Example 12.

Preparation Example 13

10 g of the fiber-like activated carbon "FE3015" (C5) produced by Futamura Chemical was immersed in 500 ml of a 18.9% concentration hydrogen peroxide solution, allowed to stand for 480 hours, then removed and dried to obtain the activated carbon of Preparation Example 13.

Preparation Example 14

10 g of the fiber-like activated carbon "FE3018" (C6) produced by Futamura Chemical was used as the activated carbon of Preparation Example 14.

Preparation Example 15

10 g of the fiber-like activated carbon "FE3018" (C6) produced by Futamura Chemical was immersed in 500 ml of a 4.2% concentration hydrogen peroxide solution, allowed to stand for 50 hours, then removed and dried to obtain the activated carbon of Preparation Example 15.

Preparation Example 16

10 g of the fiber-like activated carbon "FE3018" (C6) produced by Futamura Chemical was immersed in 500 ml of a 14.0% concentration hydrogen peroxide solution, allowed to stand for 350 hours, then removed and dried to obtain the activated carbon of Preparation Example 16.

Preparation Example 17

10 g of the fiber-like activated carbon "FE3018" (C6) produced by Futamura Chemical was immersed in 500 ml of a 18.9% concentration hydrogen peroxide solution, allowed to stand for 480 hours, then removed and dried to obtain the activated carbon of Preparation Example 17.

Preparation Example 18

10 g of the coconut shell activated carbon "CW480SZ" (C7) produced by Futamura Chemical was used as the activated carbon of Preparation Example 18.

[Activated Carbon—Measurement 2]

The surface oxides, specific surface area, and average pore diameter of Preparation Examples 2 to 18 were determined in the same manner as in "Activated Carbon—Measurement 1" above.

[Micropore Volume]

The pore volume was measured by nitrogen adsorption using an automatic specific surface area/pore distribution measuring device ("BELSORP-mini H", manufactured by MicrotracBEL Corporation). The sum of the micropore volume ($V_{mic}$) ($cm^3/g$), which is the pore volume in the range of pore diameters of 1 nm or less, of Preparation Examples 2 to 18, was obtained by analyzing the value of dV/dD in the range of pore diameters of 1 nm or less from the t-plot of the adsorption isotherm of nitrogen gas by the MP method.

[Mesopore Volume]

The dV/dD values in the pore diameter range of 2 to 60 nm were analyzed by the DH method from the adsorption isotherm of nitrogen gas. The diameter range of the pore diameters of 2 to 60 nm in the analysis software is 2.43 to 59.72 nm. From this analysis result, the sum ($V_{met}$) ($cm^3/g$) of the mesopore volume, which is the pore volume in the range of pore diameters of 2 to 60 nm, of Preparation Example 6 to 21 was obtained.

The physical characteristics of the activated carbons of Preparation Examples 2 to 18 are shown in Tables 3 to 5. From the top of Table 3, there are surface oxide amount (meq/g), BET specific surface area ($m^2/g$), average pore diameter (nm), micropore volume ($V_{mic}$) ($cm^3/g$), and mesopore volume ($V_{met}$) ($cm^3/g$).

TABLE 3

|  |  | Prep Ex 2 | Prep Ex 3 | Prep Ex 4 | Prep Ex 5 | Prep Ex 6 | Prep Ex 7 |
|---|---|---|---|---|---|---|---|
| Surface oxide amount | (meq/g) | 0.05 | 0.30 | 0.10 | 0.41 | 0.15 | 0.57 |
| BET specific surface area | ($m^2/g$) | 526 | 482 | 825 | 769 | 951 | 989 |
| Average pore diameter | (nm) | 1.94 | 1.98 | 1.54 | 1.53 | 1.59 | 1.61 |
| Micropore volume ($V_{mic}$) | ($cm^3/g$) | 0.195 | 0.168 | 0.345 | 0.315 | 0.380 | 0.394 |
| Mesopore volume ($V_{met}$) | ($cm^3/g$) | 0.069 | 0.074 | 0.001 | 0.004 | 0.026 | 0.031 |

TABLE 4

|  |  | Prep Ex 8 | Prep Ex 9 | Prep Ex 10 | Prep Ex 11 | Prep Ex 12 | Prep Ex 13 |
|---|---|---|---|---|---|---|---|
| Surface oxide amount | (meq/g) | 0.19 | 0.10 | 0.20 | 0.48 | 0.92 | 1.10 |
| BET specific surface area | ($m^2/g$) | 1320 | 1572 | 1543 | 1474 | 1356 | 1341 |
| Average pore diameter | (nm) | 1.65 | 1.76 | 1.65 | 1.64 | 1.73 | 1.71 |
| Micropore volume ($V_{mic}$) | ($cm^3/g$) | 0.531 | 0.796 | 0.641 | 0.612 | 0.546 | 0.545 |
| Mesopore volume ($V_{met}$) | ($cm^3/g$) | 0.048 | 0.094 | 0.038 | 0.041 | 0.036 | 0.075 |

TABLE 5

|  |  | Prep Ex 14 | Prep Ex 15 | Prep Ex 16 | Prep Ex 17 | Prep Ex 18 |
|---|---|---|---|---|---|---|
| Surface oxide amount | (meq/g) | 0.10 | 0.42 | 0.92 | 1.00 | 0.09 |
| BET specific surface area | (m$^2$/g) | 2017 | 1949 | 1880 | 1850 | 1740 |
| Average pore diameter | (nm) | 1.89 | 1.84 | 1.80 | 1.78 | 1.99 |
| Micropore volume ($V_{mic}$) | (cm$^3$/g) | 0.841 | 0.838 | 0.815 | 0.776 | 0.711 |
| Mesopore volume ($V_{mes}$) | (cm$^3$/g) | 0.124 | 0.117 | 0.110 | 0.090 | 0.241 |

[Collection Efficiency of Per- and Polyfluoroalkyl Compounds in Water Sample—Measurement 2]

Evaluation was performed using PFOA and PFOS as the per- and polyfluoroalkyl compounds.

The standard reagents of PFOA and PFOS of the target substances were added to ultrapure water, and the solution concentrations of PFOA and PFOS were adjusted to 10 ng/ml (10 ppb) to prepare a test solution.

0.2 g of the Preparation Example described above was filled in a 20 ml syringe, and 20 ml of the test solution was passed therethrough at a rate of 1 drop/sec. After passing the liquid, the water content of the activated carbon in the Preparation Example in the syringe was removed by centrifugation. Thereafter, using 14 ml of a methanol solution adjusted to an ammonia concentration of 0.01%, the extract was collected by passing it through the dehydrated Preparation Example at a rate of 1 drop/sec.

The collected extract was concentrated to 1 ml by a nitrogen spray concentrator, and the extract was then quantitatively measured using an LC-MS/MS ("LCMS-8030", manufactured by Shimadzu Corporation) in MRM mode, and the collection performance was confirmed.

Tables 6 to 8 show the recovery rate (%) for each target substance for Preparation Examples 2 to 18. The target substances are PFOA and PFOS.

TABLE 6

|  |  | Prep Ex 2 | Prep Ex 3 | Prep Ex 4 | Prep Ex 5 | Prep Ex 6 | Prep Ex 7 |
|---|---|---|---|---|---|---|---|
| Target Substance | PFOA | 44% | 4% | 80% | 3% | 97% | 46% |
|  | PFOS | 76% | 17% | 89% | 18% | 82% | 67% |

TABLE 7

|  |  | Prep Ex 8 | Prep Ex 9 | Prep Ex 10 | Prep Ex 11 | Prep Ex 12 | Prep Ex 13 |
|---|---|---|---|---|---|---|---|
| Target Substance | PFOA | 57% | 77% | 77% | 75% | 51% | 37% |
|  | PFOS | 61% | 88% | 87% | 75% | 76% | 58% |

TABLE 8

|  |  | Prep Ex 14 | Prep Ex 15 | Prep Ex 16 | Prep Ex 17 | Prep Ex 18 |
|---|---|---|---|---|---|---|
| Target Substance | PFOA | 74% | 79% | 37% | 41% | 87% |
|  | PFOS | 87% | 98% | 52% | 34% | 98% |

Results and Discussion

Preparation Examples 3 and 5 resulted in low recovery rates for both PFOA and PFOS, and the adsorption of the target substances was insufficient. Since the specific surface area was small and the surface oxide amount was large, it is presumed that the pores capable of adsorbing the target substances were insufficient and the adsorption performance was not exhibited.

Conversely, Preparation Example 2 having a small specific surface area was able to sufficiently adsorb the target substances. This is considered to be because the amount of surface oxide was small, and thus, water molecules were less likely to be adsorbed on the functional groups on the surface of activated carbon due to hydrogen bonds, and the pores were less likely to be blocked by the clusters of water molecules generated thereby, and as a result, there were sufficient pores capable of adsorbing the target substance, even though the specific surface area was small. Thus, it is considered that the adsorption performance of the activated carbon was suitably exhibited.

It was shown that the target substances were also adsorbed in Preparation Examples 12, 13, 16, and 17, which had large surface oxide amounts. It is considered that this is because even though the surface oxide amount was large and the pores might be clogged by water molecules or clusters, since the specific surface area was large, pores necessary for adsorbing the target substance were sufficiently present. It is considered that the adsorption performance of the activated carbons was exhibited thereby and the adsorption performance of per- and polyfluoroalkyl compounds was exhibited. From this, it is understood that a specific surface area of a certain level or more or a surface oxide amount of a certain amount or less is a condition for securing the adsorption performance of per- and polyfluoroalkyl compounds in a water sample.

As can be understood from the results of Preparation Examples 9 to 13 and 14 to 17, which are Examples in which the same activated carbon was used but the surface oxide amount was changed, the adsorption performance tended to be inferior in Preparation Examples with a surface oxide amount increased by oxidation treatment, as compared to Preparation Examples without undergoing an oxidation treatment or with a small surface oxide amount when undergoing an oxidation treatment. Thus, as described above, it can be understood that it is preferable that the surface oxide amount be small for the adsorption performance of per- and polyfluoroalkyl compounds in a water sample.

When Preparation Examples 2, 6, 9, and 14, which had similar surface oxide amounts, are compared with each other, it was shown that the adsorption of per- and polyfluoroalkyl compounds in a water sample was suitable when the specific surface area was a certain level or more. In particular, it is considered that when the surface oxide amount is small, sufficient adsorption performance is exhibited when the BET specific surface area is 800 m$^2$/g or more, and when the surface oxide amount is large, the larger the specific surface area, the better the adsorption performance tends to be.

It was also shown that the adsorption performance was further improved for both PFOA and PFOS when the specific surface area was large and the surface oxide amount was small. It was found that the adsorption performance of per- and polyfluoroalkyl compounds in a water sample was further improved and a suitable recovery rate was exhibited when the specific surface area was a certain level or more and the surface oxide amount was a certain level or less. From the viewpoint of contact efficiency between the target substance and the activated carbon, it is considered that fiber-like activated carbon can more efficiently adsorb per- and polyfluoroalkyl compounds.

Furthermore, if the activated carbon has developed micropores while satisfying the above conditions, it can be inferred that the adsorption performance of per- and polyfluoroalkyl compounds in a water sample will be even greater. It can be inferred that when mesopores are developed, the molecules of the target substance are smoothly introduced into the pores of the activated carbon, and excellent adsorption performance is exhibited. Furthermore, after adsorbing the molecules of the target substance in the micropores, it is easy for them to be smoothly desorbed to the outside of the pores during the extraction operation, whereby it is considered that the recovery rate is suitable.

INDUSTRIAL APPLICABILITY

Since the activated carbon for adsorbing per- and polyfluoroalkyl compounds in a water sample of the present invention can desorbably adsorb per- and polyfluoroalkyl compounds in a water sample, quantitative measurement of these compounds, which was not possible with existing collection materials, has become possible. This enables effective quantitative evaluation of Persistent Organic Pollutants.

The invention claimed is:

1. An activated carbon for adsorbing per- and polyfluoroalkyl compounds in a water sample to desorbably adsorb per- and polyfluoroalkyl compounds in a water sample, wherein the BET specific surface area of an activated carbon adsorbent is 800 $m^2/g$ or more, and a surface oxide amount of the activate carbon adsorbent is ranged from 0.10 to 0.50 meq/g, and a sum (Vmic) of a volume of the activated carbon adsorbent having a pore size of 1 nm or less is ranged from 0.30 to 0.85 $cm^3/g$.

2. The activated carbon for adsorbing per- and polyfluoroalkyl compounds in the water sample according to claim 1, wherein the activated carbon adsorbent is a fiber-like activated carbon.

3. A filter body for adsorbing per- and polyfluoroalkyl compounds in a water sample, wherein the activated carbon according to claim 1 is retained therein.

* * * * *